United States Patent Office 3,591,408
Patented July 6, 1971

3,591,408
PROCESS FOR COLORING GLASS FIBERS
AND FABRICS
Alfred Marzocchi, Cumberland, R.I., and David W. Boyes,
Bedford, Va., assignors to Owens-Corning Fiberglas
Corporation
No Drawing. Filed Dec. 6, 1967, Ser. No. 688,309
Int. Cl. C03c 25/02
U.S. Cl. 117—54                                    12 Claims

ABSTRACT OF THE DISCLOSURE

The coloring of glass fibers by treatment of the glass fibers with the combination of an amino and/or epoxy silane, its silanol or polysiloxane and a fiber reactive Procilan dye or Procion dye having groupings that react with the amino or epoxy groups of the organo silicon compound to form an organo silicon-dye compound that becomes strongly anchored to the glass fiber surfaces with sufficient dye concentration to impart the desired color intensity.

This invention is addressed to the problem of coloring glass fibers in fiber or fabric form and to the method for coloring glass fiber fabrics.

Glass fibers, having sufficient color intensity, are incapable of being produced merely by the incorporation of coloring components into the molten glass of which the fibers are formed. This is because it is difficult to incorporate sufficient of the inorganic pigment component with the glass fiber forming materials without destroying the ability for rapid attenuation of the streams of molten glass in fiber formation or without interfering with the desirable physical or mechanical characteristics of the formed glass fibers.

As a result, research has been concentrated towards the treatment of the glass fibers or fabrics formed thereof with a coating or finish containing the coloring agent as a component. A large number of problems arise in utilization of this technique for coloring glass fibers or fabrics formed thereof.

The more difficult problem arises from the inability of establishing a strong and permanent bond between the glass fiber surfaces and the color coating whereby the color will remain attached to the glass fiber surfaces during use and will have sufficient wash fastness to avoid loss in color in response to washing the colored glass fiber fabric in aqueous soap solutions or the like. This is because glass fibers constitute solid rod-like members having perfectly smooth surfaces to which physical attachment is difficult to achieve. The problem is further aggravated by the fact that groupings that predominate on the glass fiber surfaces are hydrophilic in character so that a water film forms in preference on the glass fiber surfaces to displace the color coating under high humidity or in the presence of wash water.

Additional problems reside in the impracticability of building up a sufficient thickness of coating onto the glass fiber surfaces to provide the desired color intensity without increasing the bulk and stiffness of the coated glass fibers and without destroying the hand, feel or crock-resistance of fabrics formed thereof.

It is an object of this invention to provide a means and method for the treatment of glass fibers and fabrics formed thereof to impart a color to the glass fiber system which gives the desired color intensity, which has good light fastness, crock-resistance, good hand and good wash fastness, which remains relatively permanently bonded to form a part of the glass fiber system, which does not result in loss of color during wear, aging or washing, which can be obtained without excessive buildup of coating material on the glass fiber surfaces, and which can be processed in a simple and efficient manner with low cost and readily available materials and without the need to make use of specialized equipment or labor.

The concepts of this invention reside in the treatment of the glass fibers with the combination of an organo silicon compound and a dyestuff in which the organo silicon compound is formulated of groupings capable of strong and permanent attachment to the glass fiber surfaces and to the groupings capable of reaction with groupings available in the dye molecule whereby the organo silicon compound becomes a part of the dye molecule to anchor the dye system to the glass fiber system while permitting a sufficiently high concentration of dyestuff to impart the desired color intensity to the glass fibers without destroying their hand and feel.

As the organo silicon compound, use is made of an amino or epoxy silane, its hydrolysis product (silanol) or its polymerization product (polysiloxane) in which the silane has the general formula $R_nSiX_{4-n}$ in which X is a highly hydrolyzable group such as a halogen of the type bromine, chlorine, iodine or short chained alkoxy group such as ethoxy, methoxy and the like, or an amino group, R is an organic group attached to the silicon atom directly or through an oxygen group, and in which at least one of the R groups has a free amine, hydroxy and/or an epoxy group, and $n$ is an integer of from 1 to 3. Representative of such amino silanes are gamma-aminopropyltriethoxy silane, beta-aminoethyltriethoxy silane, aminomethyltriethoxy silane, aminopropyltrimethoxy silane, diaminopropyldiethoxy silane, triaminopropylethoxy silane, etc. Excellent use has been made of an amino polysiloxane identified as delta-aminobutylmethyl silicone, marketed under the designation X–1806 and Silirama 110, by the Union Carbide Corporation, and having the general formula

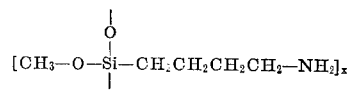

and a compound marketed by Dow-Corning under the designation Z–6020 having the general formula

Representative of an organo silane having a suitable hydroxy group is gamma-hydroxy propyltriethoxy silane and a suitable epoxy group are the following compounds marketed by Union Carbide Corporation under the trade names Y–4086 and Y–4087 having the general formulas:

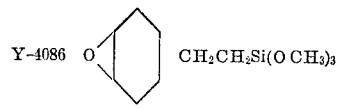

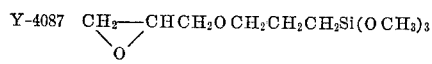

The preferred dyestuff for use in combination with the amino or epoxy organo silicon compound constitutes a class of dyes identified as fiber reactive dyes of the type marketed under the name "Procilan" dyes by Imperial Chemical Industries of Great Britain, and its American subsidiary ICI Organics of Providence, R.I. The fiber reactive dyestuffs are acid dyes having one or more reactive groups which include monochloride, dichloride, vinyl sulfone, tetrachloro or pyrimdine groups. They also contain a metal atom, usually chromium, per two dye molecules and the reactor groups are activated by alkalinity such that by exposure to an active hydrogen, such as in the amino or hydroxy silane in which the dye itself can react with the active hydrogen, the dyestuff combines with the amino silane, its silanol or polysiloxane into a single dye-organo silicon compound molecule with the release of hydrogen chloride as a gas. Thus it is capable of reaction with active hydrogen groups, such as hydroxyls in the organo silicon compound or resins, such as polyvinyl alcohol and on the metallic ion of the dyestuff.

In the preferred practice of this invention, the fiber reactive acid dyestuff and the amino, hydroxy or epoxy organo silicon component are reacted one with another to form the organo silicon-dye compound before application onto the glass fiber surfaces. Instead, they can be applied separately onto the glass fiber surfaces for reaction one with the other in situ on the glass fibers. In the latter instance, it is desirable first to coat the glass fibers with the organo silicon compound and then overcoat the treated glass fibers with the fiber reactive dyestuff so that the organo silicon compound will be in position for attachment to the glass fiber surfaces, on the one hand, and for reaction to tie in with the dyestuff, on the other hand. For reaction one with the other, the components can be employed in the molar ratio of one mole fiber reactive dye to 1 to 7 moles of the organo silicon compound or equivalent containing the amine or the epoxy group and preferably in the ratio of one mole of the dye to 1 to 3 moles of the organo silicon compound. It will be understood that when the organo silicon compound is applied onto the glass fiber surfaces separate and apart form the fiber reactive dye, as a first coating, the ratio of components assumes less importance since it is sufficient if only a small fraction of the organo silicon compound available on the surfaces reacts with the fiber reactive dyestuff to form the desired reaction product.

Dyestuffs having dichlorotriazine as the reactive grouping can also be employed in the combination with the organo silicon amino and/or epoxy compounds for reaction to produce the organo silicon-dye compound capable of strong and permanent anchorage onto the glass fiber surfaces. Such dyestuffs, marketed by the same facilities as the aforementioned Procilan dyes are identified in the trade as Procion dyestuffs and may be represented by the following formula:

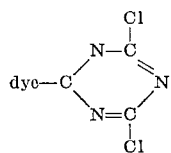

The Procion dyestuffs are applied at a temperature of about 100–150° F., preferably in the presence of sodium sulphate and sodium carbonate as activating agents.

To achieve optimum results, it is desirable to remove the original size applied to the glass fiber surfaces in forming so that the surfaces of the bare glass fibers will be exposed to the organo silicon-dye compound or the organo silicon and dye compounds for permanent anchorage thereto. This is best achieved after the sized glass fibers have been processed to the form desired for use, as in the form of strands, yarns, threads, cords and preferably woven or non-woven fabrics.

Size removal to bare the surfaces of the glass fibers can be achieved by heat cleaning the glass fibers or fabric formed thereof by exposure in an oxidizing atmosphere to a temperature above 1050° F. but sufficiently below the fusion temperature of the glass so that the fibers will retain their fibrous characteristics. The original size will burn cleanly from the glass fiber surfaces while weave setting the glass fibers. Instead, the original size can be washed from the glass fibers by soap water and dried to bare the glass fiber surfaces.

The following examples will illustrate the practice of this invention in the coloring of woven fabrics of glass fibers after the original size has been removed by heat cleaning:

EXAMPLE 1

0.1–5.0 percent by weight gamma-aminopropyltriethoxy silane
Remainder water

The organo silicon finish composition is padded onto the fabric of cleaned glass fibers and allowed to air dry.

The organo silicon coated fibers are then padded with a 1 to 5 percent by weight solution of the fiber reactive acid dye. The treated glass fibers are air dried and then heated to cure at an elevated temperature, such as 150–250° F.

The dyed fabric exhibits good light fastness, good crock-resistance and good wash fastness.

EXAMPLE 2

The procedure of Example 1 is followed except that an organo silicon finish is applied onto the dye glass fibers. For this purpose, the dyed fabric of Example 1 is finished with an overcoating of gamma-aminopropyltriethoxy silane and heated to a temperature of about 250° F.

EXAMPLE 3

1 to 3 moles of delta-aminobutylmethyl silane (Y–1806) and 1 mole of fiber reactive dyestuff are combined by reaction and applied from a 1 to 5 percent by weight solution in aqueous medium by padding onto a heat cleaned fabric of glass fibers.

Instead of pre-reacting the organo silicon and dyestuff, the silicon and dyestuff can be applied from separate solutions with the organo silicon applied first and then the dyestuff followed by heating to cure at a temperature of about 150° F.

A deep shade is obtained which has good crock-resistance and which has been tested by washing for 2½ hours at 120 F. in a Wash-O-Meter test launder, without loss in color. The wash fastness is further improved if the dyed fabric is additionally finished with a conventional glass fiber finish such as Epoxal 7–4.

EXAMPLE 4

The process of Example 3 is repeated except that the silicon is plasticized with 10 to 25 percent by weight of a modified dimethyl silicone oil.

EXAMPLE 5

An epoxy silane, such as

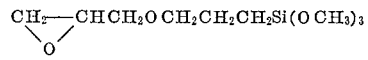

is combined with the fabric reactive dyestuff in equal molecular ratio and padded onto the cleaned glass fiber surfaces from a 1 to 3 percent solution in aqueous medium. Instead, the components can be separately applied from 1 to 3 percent by weight solutions with the epoxy silane being applied first and then the dyestuff followed by air drying, without and preferably with a subsequent glass fiber finish as in Example 4.

The dyed glass fiber fabric has excellent hand, good crock-resistance and good wash fastness and it retains its applied color after washing for a considerable length of time in wash water with ivory soap.

EXAMPLE 6

A heat cleaned glass fiber fabric is first pre-treated to coat the fibers with delta-aminobutylmethyl silane (Y–1806) by padding with a 2 percent solution. The dried silicone treated glass fiber fabric is then padded with a Procion dye at a temperature of 120° F. in a 1 to 5 percent by weight aqueous solution with sodium sulphate and sodium carbonate. The dyestuff is set on the treated glass fiber surfaces by air drying and then heating to 150° F. to cure.

The dyed fabric can be scoured in soap water up to a temperature of 185° F. without loss of color.

As a further modification of this invention, since the fiber reactive dye is capable of taking up a hydroxyl group for reaction, the glass fibers can be provided with a finish or size coating formulated of a water soluble hydroxy resin, such as polyvinyl alcohol. Treatment with the dyestuff will effect reaction with such hydroxy groups not only to effect attachment of the dyestuff but insolubilization of the resin whereby the permanence and wash fastness can be achieved.

It will be apparent from the foregoing that dye systems capable of strong anchorage to the glass fiber surfaces and which provide the desired color intensity can be achieved on glass fibers with the application of such amounts as would not disturb the hand or feel or crock-resistance of the fibers and fabrics formed thereof nor interfere with the fibrous character of the product. As a result, colored glass fibers and fabrics can be produced which retain all of the desirable characteristics of fabrics formed of glass fibers and which have good light fastness and wash fastness to permit normal usage of the glass fibers colored in accordance with the practice of this invention.

It will be understood that changes may be made in the details of construction, arrangement and operation without departing from the spirit of the invention, especially as defined in the following claims.

We claim:

1. The method of coloring glass fibers and fabrics formed thereof comprising coating the glass fiber surfaces with an organo silicon compound formed of an organo silane having the formula:

$$R_nSiX_{(4-n)}$$

in which X is a highly hydrolyzable group, R is a hydrocarbon group in which at least one R group is a hydrocarbon containing a hydroxyl group, and $n$ is an integer from 1–3, and thereafter treating the coated glass fibers with a fiber reactive dye whereby the dye combines by reaction with the hydroxy group on the organo silicon compound to bond the dye to the glass fiber surfaces.

2. The method as claimed in claim 1 in which the glass fibers and fabric are heat cleaned to remove any original size before coating with the organo silicon compound.

3. The method as claimed in claim 1 in which the organo silicon and dye are reacted in the molecular ratio of 1 mole fabric reactive dye to 1 to 7 moles of the organo silicon compound.

4. The method as claimed in claim 1 in which the organo silicon and dye are reacted in the molecular ratio of 1 mole dye to 1 to 3 moles of the organo silicon compound.

5. The method of coloring glass fibers and fabrics formed thereof comprising coating the glass fiber surfaces with an organo silicon compound formed of an organo silane having the formula:

$$R_nSiX_{(4-n)}$$

in which X is a highly hydrolyzable group, R is a hydrogroup in which at least one R group is a hydrocarbon containing a hydroxy group and $n$ is an integer from 1–3, and thereafter treating the coated glass fibers with a dichlorotriazine dye whereby the dye combines by reaction with the hydroxyl group of the organo silicon compound to bond the dye to the glass fiber surfaces.

6. The method as claimed in claim 5 in which the dye compound is applied onto the glass fiber surfaces while at a temperature within the range of 100° to 150° F.

7. The method as claimed in claim 6 in which the dye compound is applied to the glass fiber surfaces in the presence of sodium sulphate and sodium carbonate.

8. The method as claimed in claim 5 which includes the step of precleaning the surfaces of the glass fibers to remove any original size.

9. Fabrics of interwoven glass fiber yarns having a coloring agent on the surface of the glass fibers to color the glass fibers in which the coloring agent comprises an organo silicon-fabric reactive dye compound consisting of the product of the reactive dye and an organo silicon compound formed of an organo silane having the formula:

$$R_nSiX_{(4-n)}$$

in which X is a highly hydrolyzable group, R is a hydrocarbon group at least one of which contains a hydroxy group and $n$ is an integer from 1–3.

10. Glass fibers having a coloring agent on the surfaces of the glass fibers to color the glass fibers in which the coloring agent comprises the product of the reaction of a dichlorotriazine dye and an organo silicon compound formed of an organo silane having the formula:

$$R_nSiX_{(4-n)}$$

in which X is a highly hydrolyzable group, R is a hydrocarbon group at least one of which contains a hydroxy group and $n$ is an integer from 1–3.

11. Glass fibers of claim 10 gathered together in the form of a multi-filament strand.

12. Glass fibers of claim 10 in the form of a textile yarn.

References Cited

UNITED STATES PATENTS

| | | | |
|---|---|---|---|
| 2,971,864 | 2/1961 | Speier | 117—124 |
| 3,278,484 | 10/1966 | Tesoro | 8—8X |

FOREIGN PATENTS

| | | | |
|---|---|---|---|
| 242,146 | 12/1962 | Australia | 8—S. digest |

WILLIAM D. MARTIN, Primary Examiner

D. COHEN, Assistant Examiner

U.S. Cl. X.R.

117—76, 126; 8—8, 31